United States Patent
Kim et al.

(10) Patent No.: US 12,412,499 B2
(45) Date of Patent: Sep. 9, 2025

(54) ELECTRONIC DEVICE FOR MANAGING TEMPERATURE, AND OPERATING METHOD THEREFOR

(71) Applicant: SAMSUNG ELECTRONICS CO., LTD., Suwon-si (KR)

(72) Inventors: Youngrog Kim, Suwon-si (KR); Kibeom Kim, Suwon-si (KR); Junwoo Choi, Suwon-si (KR); Myunghoon Kwak, Suwon-si (KR); Jookwan Lee, Suwon-si (KR); Jihea Park, Suwon-si (KR); Yangwook Kim, Suwon-si (KR); Junghyeob Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/605,060

(22) Filed: Mar. 14, 2024

(65) Prior Publication Data

US 2024/0221563 A1 Jul. 4, 2024

Related U.S. Application Data

(63) Continuation of application No. PCT/KR2022/013458, filed on Sep. 7, 2022.

(30) Foreign Application Priority Data

Sep. 17, 2021 (KR) .................... 10-2021-0124843

(51) Int. Cl.
G09G 3/00 (2006.01)
G01K 13/00 (2021.01)
(Continued)

(52) U.S. Cl.
CPC ............. *G09G 3/035* (2020.08); *G01K 13/00* (2013.01); *G06F 3/04845* (2013.01);
(Continued)

(58) Field of Classification Search
CPC ............. G09G 3/035; G09G 2320/041; G09G 2354/00; G01K 13/00; G01K 1/02;
(Continued)

(56) References Cited

U.S. PATENT DOCUMENTS 8,836,718 B2 9/2014 Choi et al.
9,098,188 B2 8/2015 Kim
(Continued)

FOREIGN PATENT DOCUMENTS

KR 10-1638056 7/2016
KR 10-2018-0134236 12/2018
(Continued)

OTHER PUBLICATIONS

International Search Report dated Dec. 29, 2022 in PCT/KR2022/013458, 4 pages.

*Primary Examiner* — Stephen G Sherman
(74) *Attorney, Agent, or Firm* — Nixon & Vanderhye, P.C.

(57) ABSTRACT

Disclosed is an electronic device comprising: a sensor configured to measure a temperature of the electronic device; a flexible display wherein an area of the flexible display visible to the outside can be changed; a memory storing executable instructions; and at least one processor, comprising processing circuitry configured to access the memory and execute the instructions, wherein at least one processor, individually and/or collectively, is configured to: identify a first input for changing the size of the visible area of the flexible display, identify the temperature of the electronic device via the sensor based on the identification of the first input, and identify change conditions of the size of the flexible display based on the identified temperature.

19 Claims, 20 Drawing Sheets

(51) Int. Cl.
  *G06F 3/04845* (2022.01)
  *G06F 3/16* (2006.01)
  *G06F 3/01* (2006.01)
  *G06F 3/0488* (2022.01)
(52) U.S. Cl.
  CPC ............ *G06F 3/016* (2013.01); *G06F 3/0488* (2013.01); *G06F 3/167* (2013.01); *G09G 2320/041* (2013.01); *G09G 2354/00* (2013.01)
(58) Field of Classification Search
  CPC .... G06F 3/04845; G06F 3/016; G06F 3/0488; G06F 3/167; G06F 3/01; G06F 3/02; G06F 3/0484; G06F 3/16; G06F 1/16; G06F 1/20
  See application file for complete search history.

(56) References Cited

U.S. PATENT DOCUMENTS

| | | |
|---|---|---|
| 9,524,057 B2 | 12/2016 | Cho et al. |
| 10,304,417 B2 | 5/2019 | Park et al. |
| 11,062,683 B2 | 7/2021 | Park et al. |
| 11,380,283 B2 | 7/2022 | Shim et al. |
| 11,385,684 B2 | 7/2022 | Kwon |
| 11,520,387 B2 | 12/2022 | Koo et al. |
| 2011/0157029 A1 | 6/2011 | Tseng |
| 2012/0064946 A1* | 3/2012 | Voetberg ............... G06F 3/0481 455/566 |
| 2012/0127088 A1* | 5/2012 | Pance ................. G06F 3/04812 345/173 |
| 2014/0015784 A1* | 1/2014 | Oonishi ............ H04M 1/72403 345/173 |
| 2014/0282161 A1 | 9/2014 | Cash |
| 2014/0372920 A1 | 12/2014 | Choi et al. |
| 2015/0348493 A1* | 12/2015 | Chae ........................ G09G 5/14 345/212 |
| 2017/0300217 A1 | 10/2017 | Brasseur et al. |
| 2019/0088212 A1 | 3/2019 | Itoh et al. |
| 2020/0090628 A1 | 3/2020 | Park et al. |
| 2022/0121244 A1* | 4/2022 | Kwon ................... G06F 1/1652 |
| 2023/0029563 A1 | 2/2023 | Choi et al. |
| 2023/0102896 A1 | 3/2023 | Koh et al. |

FOREIGN PATENT DOCUMENTS

| | | |
|---|---|---|
| KR | 10-1946365 | 2/2019 |
| KR | 10-2020-0064573 | 6/2020 |
| KR | 10-2021-0037548 | 4/2021 |
| KR | 10-2246554 | 4/2021 |
| KR | 10-2256681 | 5/2021 |
| WO | 2021/085658 | 5/2021 |
| WO | 2021/107225 | 6/2021 |
| WO | 2021/141162 | 7/2021 |

* cited by examiner

ELECTRONIC DEVICE FOR MANAGING TEMPERATURE, AND OPERATING METHOD THEREFOR

CROSS-REFERENCE TO RELATED APPLICATIONS

This application is a continuation of International Application No. PCT/KR2022/013458 designating the United States, filed on Sep. 7, 2022, in the Korean Intellectual Property Receiving Office and claiming priority to Korean Patent Application No. 10-2021-0124843, filed on Sep. 17, 2021, in the Korean Intellectual Property Office, the disclosures of each of which are incorporated by reference herein in their entireties.

BACKGROUND

Field

The disclosure relates to an electronic device for managing a temperature and an operating method therefor.

Description of Related Art

An electronic device may provide various functions, such as the playback of media content, games, and web surfing, as well as voice calls or short messages. There is a need to expand a display of the electronic device for a user to conveniently use the various functions of the electronic device. However, as the display becomes wider, the portability of the electronic device may decrease. Thus, an electronic device capable of mounting a flexible display and changing a display area, for example, a foldable-, rollable-, or slidable-type electronic device has been developed. A wide screen may be provided, if necessary, to improve the convenience of use, while maintaining the excellent portability of the electronic device, by means of a structure in which it is able to expand or collapse the display area.

The electronic device may include a driving unit which provides a physical force for expanding or collapsing the display area.

A driving unit of an electronic device may malfunction due to a temperature, or the life of the driving unit of the electronic device may be shortened.

When the driving unit malfunctions, an error in software may occur and a damage in hardware may occur in another component combined with the driving unit.

SUMMARY

According to an example embodiment of the disclosure, an electronic device is provided. The electronic device may include: a sensor configured to measure a temperature of the electronic device, a flexible display, a size of an externally visible area of the flexible display being changeable, a memory storing executable instructions, and at least one processor, comprising processing circuitry, that individually and/or collectively, is configured to access the memory and execute the instructions. At least one processor, individually and/or collectively, may be configured to: identify a first input for changing the size of the visible area of the flexible display, identify the temperature of the electronic device via the sensor based on identifying the first input, and identify a size change condition of the flexible display based on the identified temperature.

According to an example embodiment of the disclosure, a method of operating an electronic device is provided. The method may include: identifying a first input for changing a size of an externally visible area of a flexible display of the electronic device, identifying a temperature of the electronic device via a sensor of the electronic device based on identifying the first input, and identifying a size change condition of the flexible display of the electronic device based on the identified temperature.

The technical problems to be addressed by the disclosure are not limited to the aforementioned problems, and any other technical problems not mentioned herein will be clearly understood from the following description by those skilled in the art to which the disclosure pertains.

According to various example embodiments disclosed in the disclosure, an input for expanding or collapsing a display area may be delayed based on a temperature, thus preventing and/or reducing malfunctioning of the driving unit.

Thus, the driving unit of the electronic device may be prevented/reduced from malfunctioning and/or the life of the driving unit of the electronic device may be improved.

Furthermore, an error in software and/or a damage in hardware, which are/is caused by the malfunction of the driving unit of the electronic device, may be avoided.

The effects that are achieved through various example embodiments of the disclosure may not be limited to what has been particularly described herein, and other advantages not described herein may be more clearly understood from the following detailed description by those skilled in the art.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar reference numbers may be used for the same or similar components.

DETAILED DESCRIPTION

Figure 1:
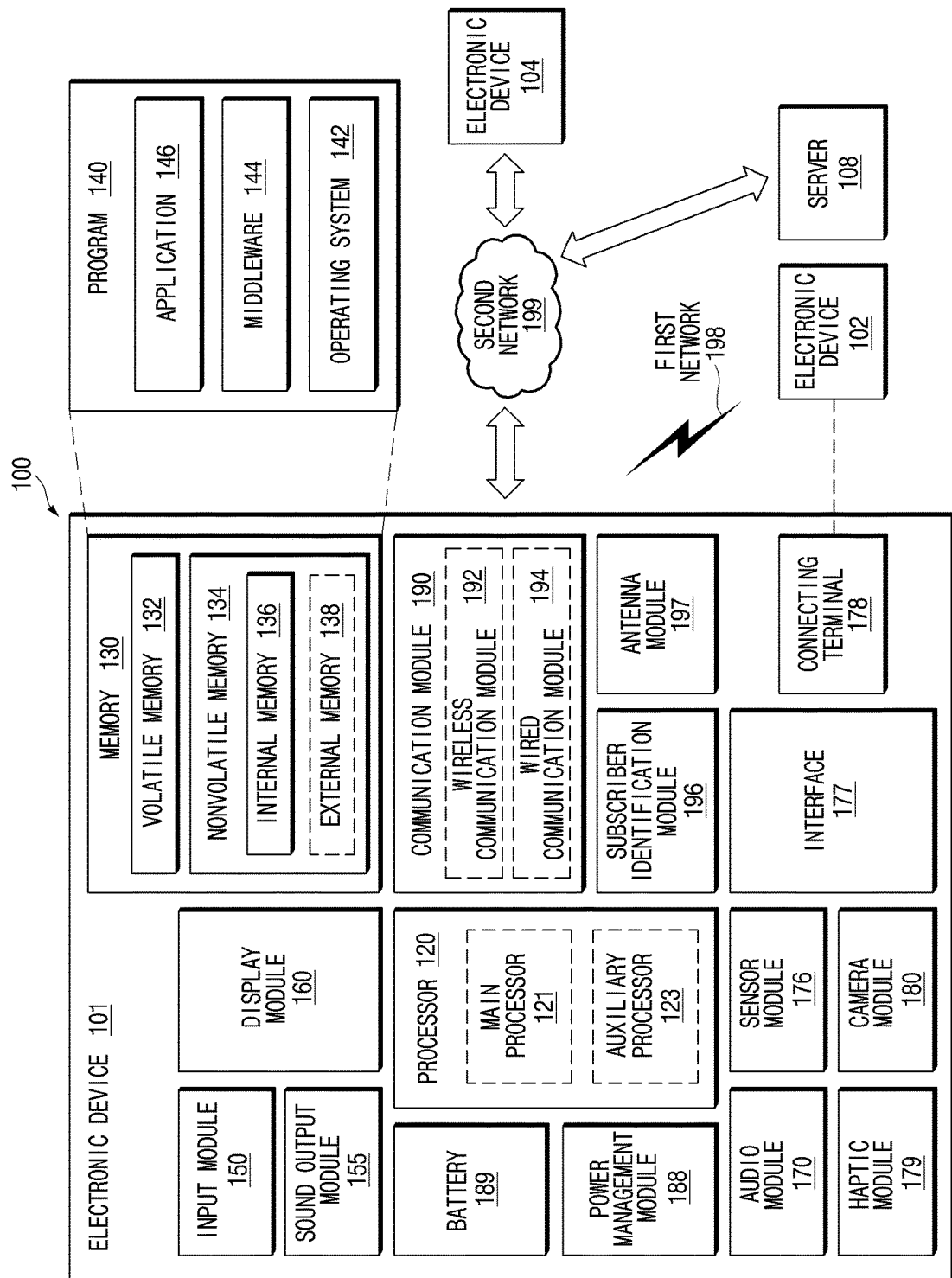
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
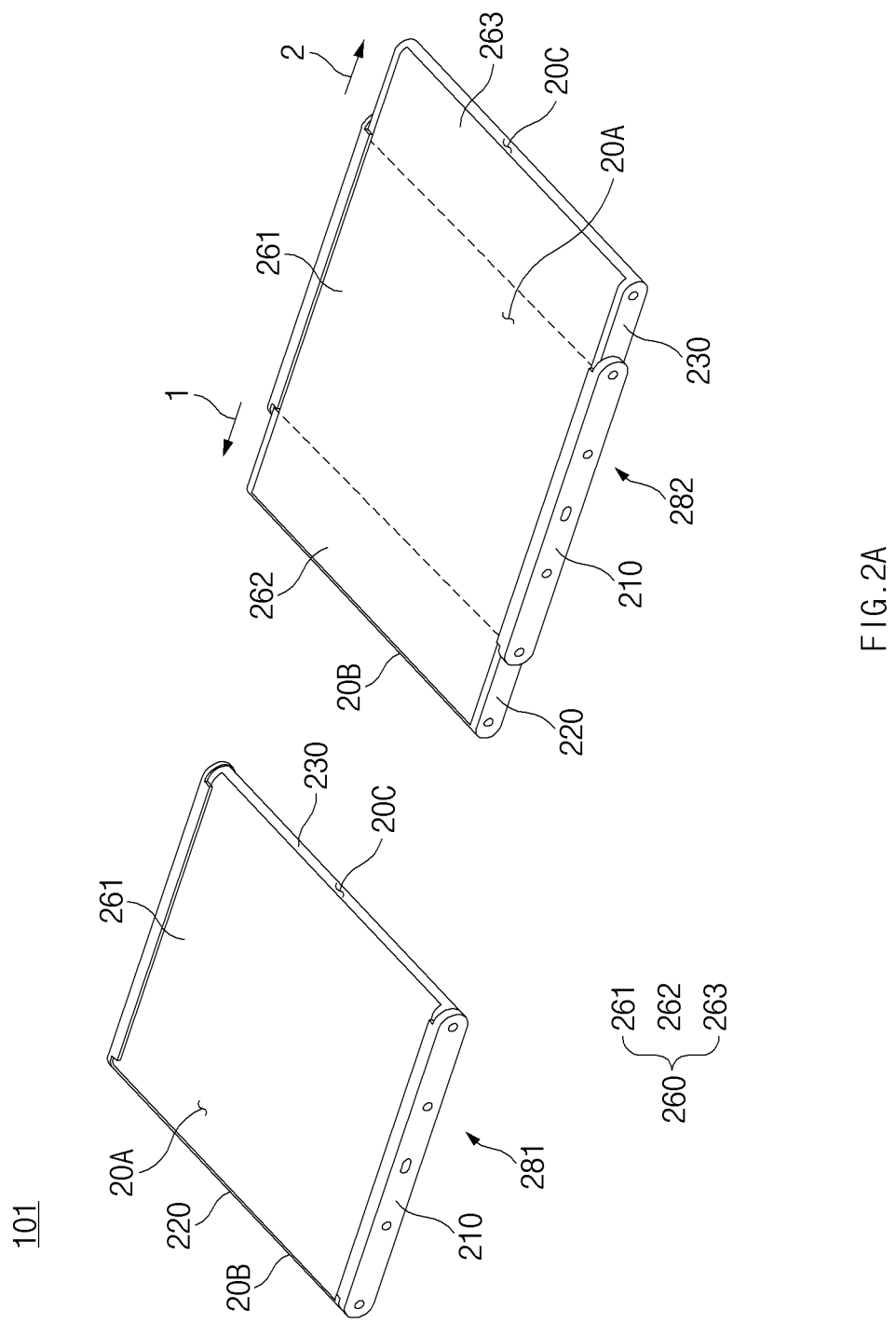
FIG. 2A included perspective views illustrating an example electronic device according to various embodiments.

FIG. 2A includes perspective views illustrating an example electronic device 101 according to various embodiments.

Referring to FIG. 2A, the electronic device 101 may be a slidable-type electronic device. In an embodiment, the electronic device 101 may be a slidable-type electronic device, two surfaces of which are able to be extended and/or collapsed. In an embodiment, the two surfaces which are able to extended and/or collapsed may be surfaces facing opposite directions. For example, the two surfaces which are able to extended and/or collapsed may be a left side surface 20B and a right side surface 20C, when looking at a display 260 of the electronic device 101 from a front surface 20A. For another example, the two surfaces which are able to extended and/or collapsed may be a flat surface and a bottom surface of the electronic device 101, when looking at the display 260 of the electronic device 101 from the front surface 20A.

In an embodiment, the electronic device 101 may include a first housing 210, a second housing 220, a third housing 230, and a display 260 (e.g., a display module 160 of FIG. 1).

In an embodiment, the second housing 220 may be coupled to the first housing 210 such that a part of the second housing 220 is able to move to the outside of the first housing 210. For example, the second housing 220 may be coupled to the first housing 210 to be movable in a first direction 1. The first direction 1 may be a direction the left side surface 20B of the electronic device 101, in which the second housing 220 is formed, faces. In an embodiment, the second housing 220 may move in the first direction 1 or a direction opposite to the first direction 1.

In an embodiment, the third housing 230 may be coupled to the first housing 210 such that a part of the third housing 230 is able to move to the outside of the first housing 210. For example, the third housing 230 may be coupled to the first housing 210 to be movable in a second direction 2. The second direction 2 may be a direction the right side surface 20C of the electronic device 101, in which the third housing 230 is formed, faces. In an embodiment, the third housing 230 may move in the second direction 2 or a direction opposite to the second direction 2.

In an embodiment, the electronic device 101 may include a collapsed state 281, an expanded state 282, and at least one intermediate state between the collapsed state 281 and the expanded state 282. In an embodiment, the state (e.g., the collapsed state 281, the expanded state 282, and/or the intermediate state) of the electronic device 101 may be determined according to a relative position of the second housing 220 and/or the third housing 230 with respect to the first housing 210.

In an embodiment, at least a part (e.g., a second area 262 and a third area 263) of the display 260 may be implemented as a flexible display and/or a rollable display. In an embodiment, the display 260 may include a touch panel layer.

In an embodiment, the display 260 may include a first area 261, the second area 262, and the third area 263. In an embodiment, the first area 261 of display 260 may be located between the second area 262 and the third area 263. In an embodiment, the second area 262 of the display 260 may extend from the first area 261. In an embodiment, the third area 263 of the display 260 may extend from the first area 261.

In an embodiment, as the second housing 220 moves in the first direction 1, the second area 262 of the display 260 may be expanded. In an embodiment, as the second housing 220 moves in the direction opposite to the first direction 1, the second area 262 of the display 260 may be collapsed.

In an embodiment, as the third housing 230 moves in the second direction 2, the third area 263 of the display 260 may be expanded. In an embodiment, as the third housing 230 moves in the direction opposite to the second direction 2, the third area 263 of the display 260 may be collapsed.

In an embodiment, when a specified signal is generated, the electronic device 101 may switch the state (e.g., the collapsed state 281, the expanded state 282, and/or the intermediate state) of the electronic device 101. In an embodiment, the electronic device 101 may switch the state of the electronic device 101 by controlling a driving device (e.g., a motor) connected with the display 260 and/or the housing (e.g., at least one of the first housing 210, the second housing 220, or the third housing 230).

In an embodiment, the specified signal may be generated by means of an input module (e.g., a first input module 150 of FIG. 1 (e.g., a button, a wheel, a dial, a toggle, or a digital pen (e.g., a stylus pen))). For example, the specified signal may be generated by means of a hardware button or a software button provided on a screen.

In an embodiment, the specified signal may be a touch, a drag, or a gesture input, which is input through the display 260.

Figure 2B:
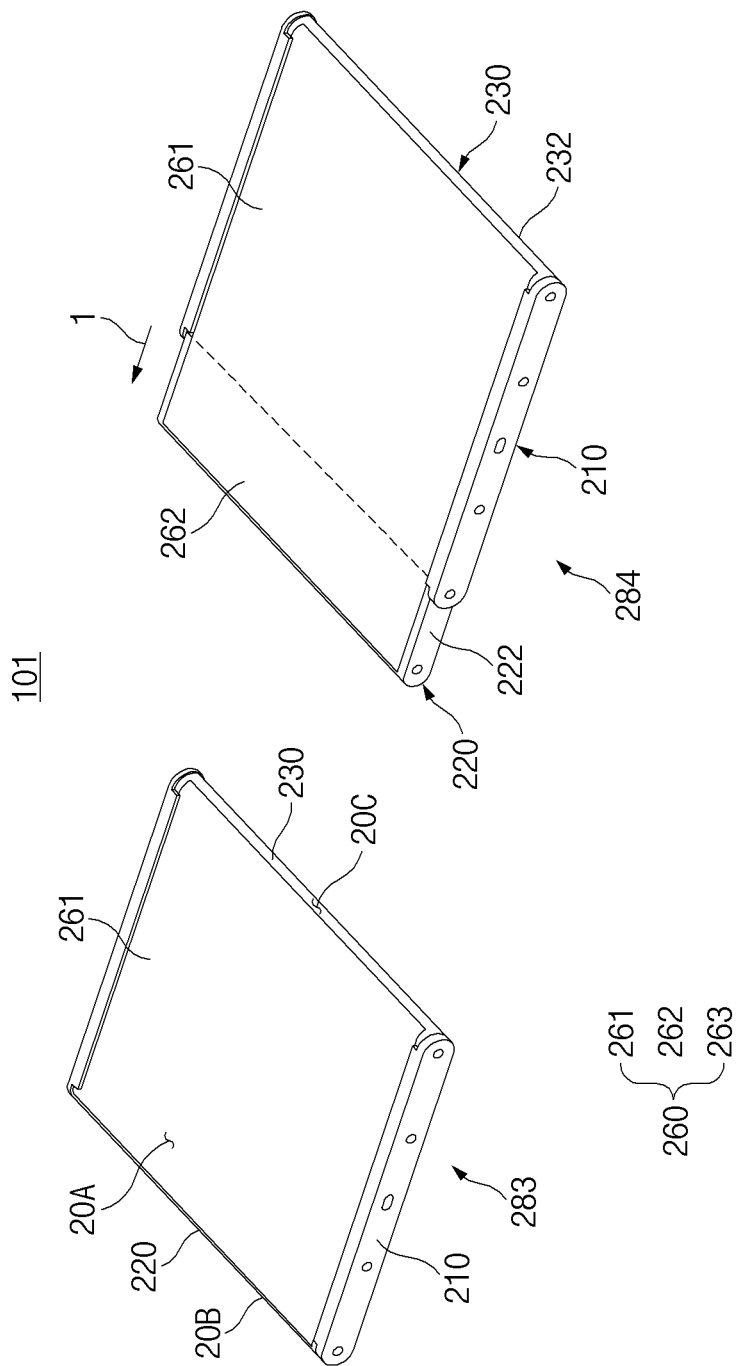
FIG. 2B includes perspective views illustrating an example electronic device according to various embodiments.

FIG. 2B is a includes perspective views illustrating an example electronic device 101 according to various embodiments. Compared to the electronic device 101 of FIG. 2A, the electronic device 101 of FIG. 2B may be a slidable-type electronic device, one surface of which is able to extended and/or collapsed. For example, the one surface which is able to extended and/or collapsed may be a left side surface 20B, when looking at a display 260 of the electronic device 101 from a front surface 20A. For another example, the one surface which is able to extended and/or collapsed may be a right side surface, a flat surface, and a bottom surface of the electronic device 101, when looking at the display 260 of the electronic device 101 from the front surface 20A.

In an embodiment, the electronic device 101 may include a collapsed state 283, an expanded state 284, and at least one intermediate state between the collapsed state 283 and the expanded state 284. In an embodiment, the state (e.g., the collapsed state 283, the expanded state 284, and/or the intermediate state) of the electronic device 101 may be determined according to a relative position of the second housing 220 with respect to the first housing 210.

In an embodiment, when a specified signal is generated, the electronic device 101 may switch the state (e.g., the collapsed state 283, the expanded state 284, and/or the intermediate state) of the electronic device 101. In an embodiment, the electronic device 101 may switch the state of the electronic device 101 by controlling a driving device (e.g., a motor) connected with the display 260 and/or the housing (e.g., at least one of the first housing 210 or the second housing 220).

Figure 2C:
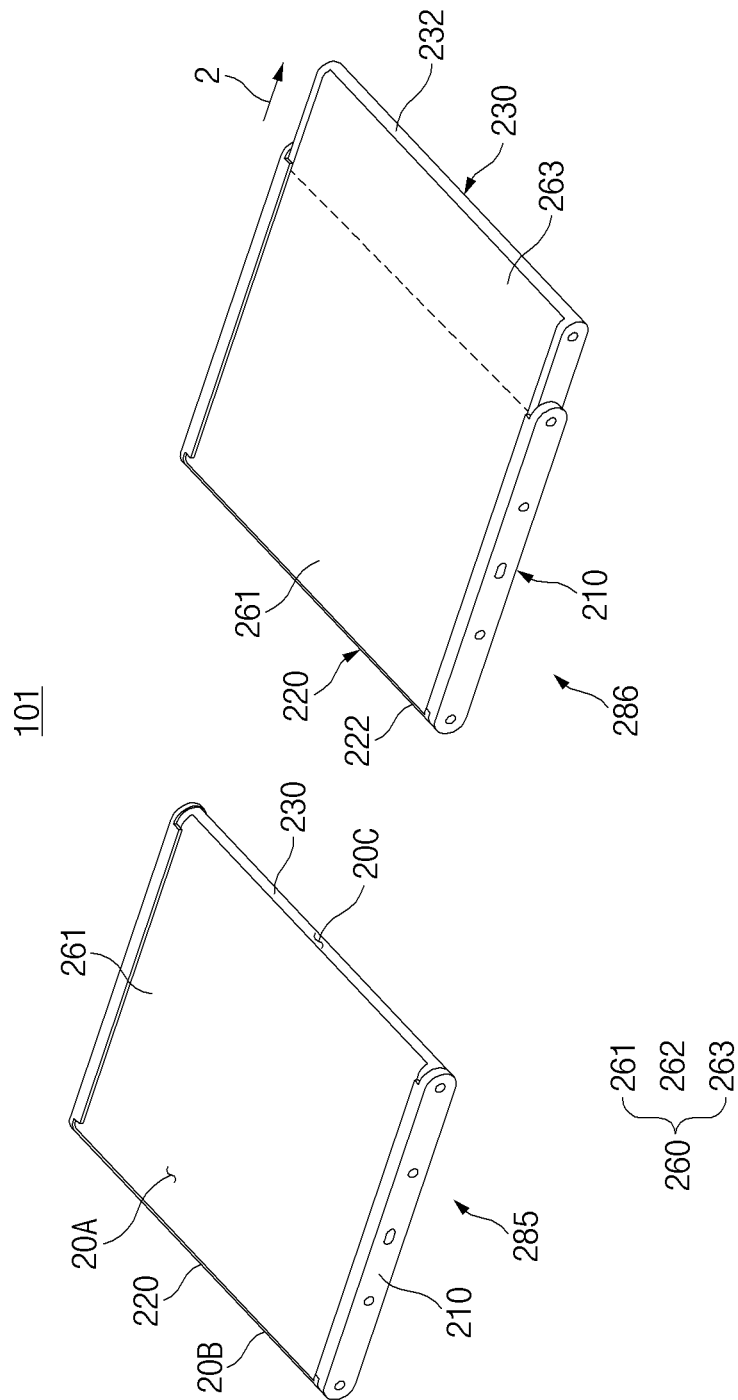
FIG. 2C includes perspective views illustrating an example electronic device according to various embodiments.

FIG. 2C includes perspective views illustrating an example electronic device 101 according to various embodiments. The electronic device 101 of FIG. 2C may be a slidable-type electronic device, one surface of which is able to extended and/or collapsed, which is different from one surface capable of being extended and/or collapsed in the electronic device 101 of FIG. 2B. For example, the one surface which is able to extended and/or collapsed may be a right side surface 20C, when looking at a display 260 of the electronic device 101 from a front surface 20A. For another example, the one surface which is able to extended and/or collapsed may be a left side surface, a flat surface, and a bottom surface of the electronic device 101, when looking at the display 260 of the electronic device 101 from the front surface 20A.

In an embodiment, the electronic device 101 may include a collapsed state 285, an expanded state 286, and at least one intermediate state between the collapsed state 285 and the expanded state 286. In an embodiment, the state (e.g., the collapsed state 285, the expanded state 286, and/or the intermediate state) of the electronic device 101 may be determined according to a relative position of a third housing 230 with respect to the first housing 210.

In an embodiment, when a specified signal is generated, the electronic device 101 may switch the state (e.g., the collapsed state 285, the expanded state 286, and/or the intermediate state) of the electronic device 101. In an embodiment, the electronic device 101 may switch the state of the electronic device 101 by controlling a driving device (e.g., a motor) connected with the display 260 and/or the housing (e.g., at least one of the first housing 210 or the third housing 230).

Figure 2D:
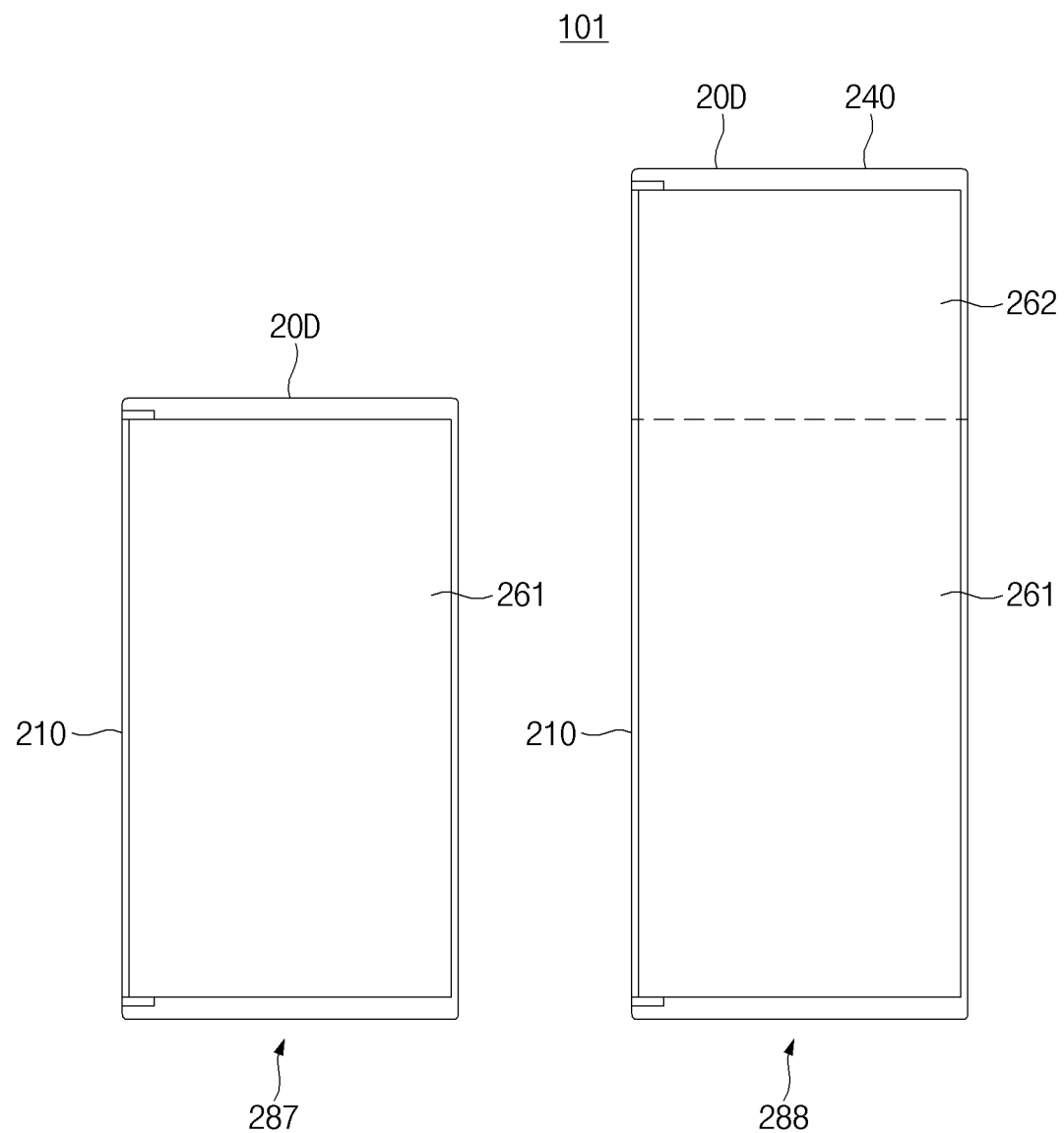
FIG. 2D is a diagram illustrating an example electronic device according to various embodiments.

FIG. 2D is a diagram illustrating an example electronic device 101 according to various embodiments. Compared to the electronic device 101 of FIG. 2A, the electronic device 101 of FIG. 2D may be a slidable-type electronic device, one surface of which is able to extended and/or collapsed. For example, the one surface which is able to extended and/or collapsed may be a flat surface 20D, when looking at a display 260 of the electronic device 101 from a front surface 20A. For another example, the one surface which is able to extended and/or collapsed may be a left side surface, a right side surface, and a bottom surface of the electronic device 101, when looking at the display 260 of the electronic device 101 from the front surface 20A.

In an embodiment, the electronic device 101 may include a collapsed state 287, an expanded state 288, and at least one intermediate state between the collapsed state 287 and the expanded state 288. In an embodiment, the state (e.g., the collapsed state 287, the expanded state 288, and/or the intermediate state) of the electronic device 101 may be determined according to a relative position of the fourth housing 240 with respect to the first housing 210.

In an embodiment, when a specified signal is generated, the electronic device 101 may switch the state (e.g., the collapsed state 287, the expanded state 288, and/or the intermediate state) of the electronic device 101. In an embodiment, the electronic device 101 may switch the state of the electronic device 101 by controlling a driving device (e.g., a motor) connected with the display 260 and/or the housing (e.g., at least one of the first housing 210 or the fourth housing 240).

Figure 2E:
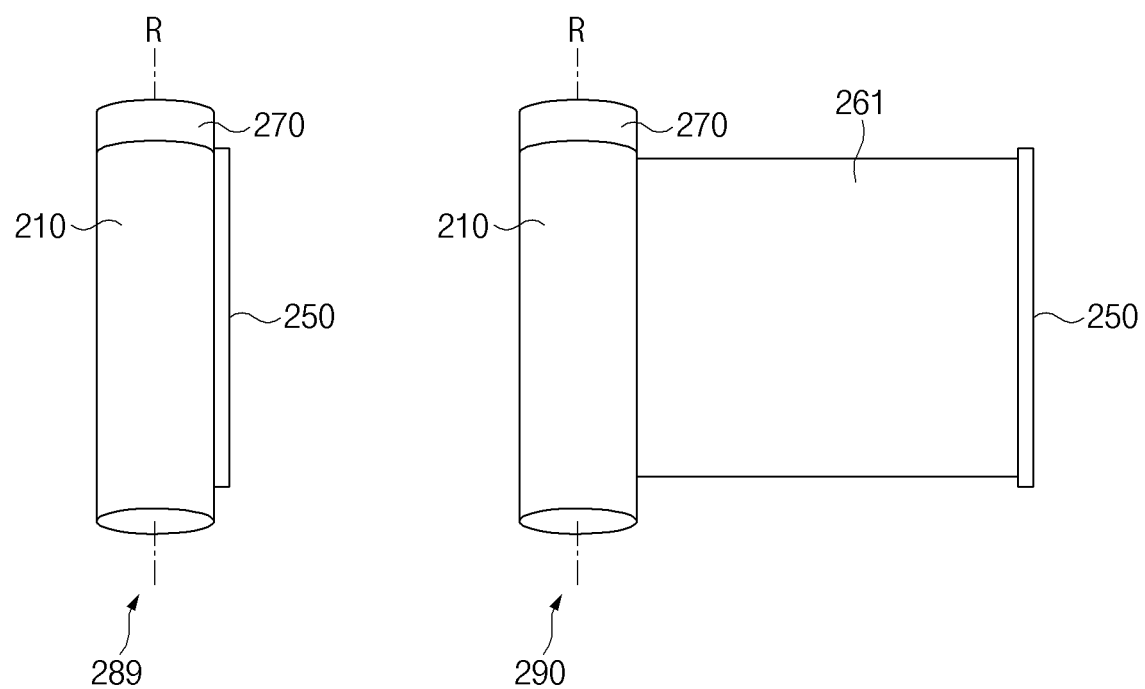
FIG. 2E is a diagram illustrating an example electronic device according to various embodiments.

FIG. 2E is a diagram illustrating an example electronic device 101 according to various embodiments.

Compared to the electronic device 101 of FIG. 2A, the electronic device 101 of FIG. 2E may be a rollable-type electronic device.

Referring to FIG. 2E, the electronic device 101 may include a housing 210, a display 260, a holder 250, and a second housing 270.

In an embodiment, as at least a part of the display 260 moves to the outside or inside of the housing 210 by manipulation of a user or a mechanical operation (e.g., driving of a motor), a visible area of the display 260, which is visible to the outside of the housing 210, may be expanded or collapsed in the electronic device 101. For example, the display 260 may be configured to be fitted into the housing 210 while winding on a roller (not shown) disposed in the housing 210 and be drawn to the outside of the housing 210 while unwinding from the roller.

In an embodiment, the electronic device 101 may include a rolled state 289, an unrolled state 290, and an intermediate state between the rolled state 289 and the unrolled state 290.

In an embodiment, the rolled state 289 may be defined as a state in which the visible area of the display 260, which is visible to the outside of the electronic device 101, has a minimum size. For example, the rolled state 289 may be a state in which the display 260 is wound as much as possible around a rotary axis R. For another example, the rolled state 298 may be a state in which the display 260 is able to no longer move towards the inside of the housing 210.

In an embodiment, at least a part of the display 260 may be visible to the outside of the housing 210 in the rolled state 289. In an embodiment, in the rolled state 289, the display 260 may be completely received in the housing 210 not to be visible to the outside of the housing 210.

In an embodiment, the unrolled state 290 may be defined as a state in which the visible area of the display 260, which is visible to the outside of the housing 210, has a maximum size. For example, the unrolled state 290 may be a state in which the display 260 is unwound as much as possible around the rotary axis R. For another example, the unrolled state 290 may be a state in which the display 260 is able to no longer move towards the outside of the housing 210. The electronic device 101 may be configured to provide a relatively expanded display area as deformed from the rolled state 289 to the unrolled state 290.

In an embodiment, the electronic device 101 may further include any intermediate state (e.g., a free stop state) defined between the rolled state 289 and the unrolled state 290. In the intermediate state, the display 260 visible to the outside of the housing 210 may be larger in size than the rolled state 289 and may be smaller in size than the unrolled state 290. For example, the electronic device 101 may be deformed from the rolled state 289 to the unrolled state 290 through the intermediate state or may be deformed from the unrolled state 290 to the rolled state 289 through the intermediate state.

In an embodiment, when a specified signal is generated, the electronic device 101 may switch the state (e.g., the rolled state 289, the unrolled state 290, and/or the intermediate state) of the electronic device 101. In an embodiment, the electronic device 101 may switch the state of the electronic device 101 by controlling a driving device (e.g., a motor) connected with the display 260 and/or the housing (e.g., at least one of the first housing 210 or the second housing 270).

Figure 3:
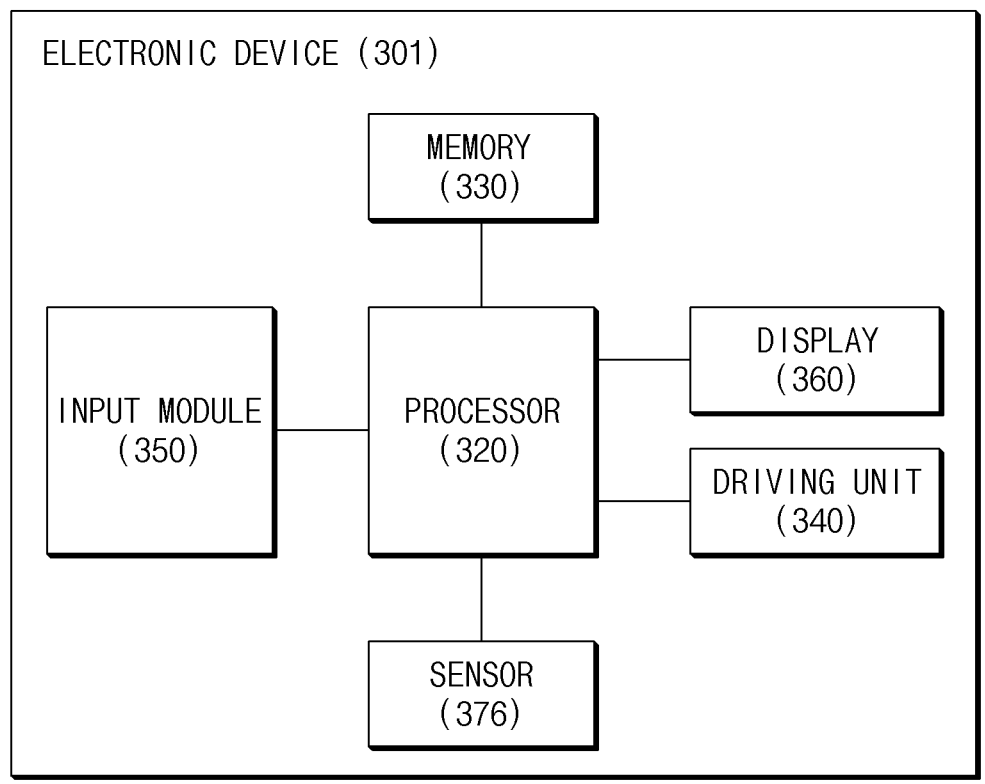
FIG. 3 is a block diagram illustrating an example configuration of an electronic device according to various embodiments.

FIG. 3 is a block diagram illustrating an example configuration of an electronic device 301 according to various embodiments. The electronic device 301 of FIG. 3 may correspond, for example, and without limitation, to an electronic device 101 of FIGS. 1, 2A, 2B, 2C, 2D, and/or 2E.

Referring to FIG. 3, the electronic device 301 may include a processor (e.g., including processing circuitry) 320, a memory 330, a driving unit (e.g., including a motor) 340, an input module (e.g., including input circuitry) 350, a display 360, a sensor 376, or any combination thereof. In an embodiment, the processor 320, the memory 330, the input module 350, the display 360, or the sensor 376 of FIG. 3 may correspond to a processor 120, a memory 130, an input module 150, a display 160, or a sensor 176 of FIG. 1, respectively.

In an embodiment, the display 360 may be a flexible display (e.g., a slidable display or a scrollable display), a visible area of which changes in size. In an embodiment, the visible area may be an area of the display 360, which is visible to a user according to a state (e.g., a collapsed state (e.g., a collapsed state 281, 283, 285, or 287), an expanded state (e.g., an expanded state 282, 284, 286, or 288), and/or an intermediate state thereof) of the electronic device 301.

In an embodiment, the driving unit 340 may provide a physical force for supporting movement of a housing (not shown) of the electronic device 301. For example, the driving unit 340 may provide a physical force for allowing a first portion and a second portion of the housing (not shown) of the electronic device 301 to be away from each other or close to each other.

In an embodiment, the driving unit 340 may provide a physical force capable of expanding and/or collapsing the display 360 of the electronic device 301. For example, the driving unit 340 may provide a physical force for a state change between the collapsed state (e.g., the collapsed state 281, 283, 285, or 287), the intermediate state, or the expanded state (e.g., the expanded state 282, 284, 286, or 288) of the display 360. For another example, the driving unit 340 may provide a physical force for a state change between a rolled state (e.g., a rolled state 289), an intermediate state, or an unrolled state (e.g., an unrolled state 290) of the display 360.

In an embodiment, the driving unit 340 may be implemented as a physical device (e.g., a motor or an actuator) capable of providing a physical force.

In an embodiment, the processor 320 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions, and may identify a first input. In an embodiment, the first input may be an input identified by means of the display 360. In an embodiment, the first input may be a touch input, a pressure input, or a gesture input. In an embodiment, the gesture input may include drag, pan, swipe, scroll, or a combination thereof. In an embodiment, the first input may be an input identified by means of the input module 350. In an embodiment, the input module 350 may include a physical button, a wheel, a dial, a digital pen (e.g., a stylus pen), and/or a toggle.

In an embodiment, the processor 320 may discriminate whether the first input is a specified input. In an embodiment, the specified input may be a portion of an input for triggering a state change of the electronic device 301. In an embodiment, the input for triggering the state change may be an input for expanding or collapsing a visible area of the display 360. In an embodiment, the input for triggering the state change may be referred to as a trigger input.

In an embodiment, the processor 320 may identify a temperature. In an embodiment, the processor 320 may identify a temperature of the electronic device 301 by means of the sensor 376. In an embodiment, the processor 320 may identify temperatures of components (e.g., the display 360 and the driving unit 340) of the electronic device 301 by means of the sensor 376.

In an embodiment, the processor 320 may apply the temperatures of the components of the electronic device 301 and weights for them to identify the temperature of the electronic device 301. In an embodiment, the processor 320 may identify the temperature of the electronic device 301 with reference to Equation 1 below.

$$\text{Temperature} = \sum_{i=1}^{N} \alpha_i \times T_i \quad \text{[Equation 1]}$$

In Equation 1, N may be the number of components of the electronic device 301, the temperature of which is measured. In Equation 1, i may be an integer which is greater than or equal to 1 and is less than or equal to N. $\alpha_i$ may be the weight applied to an ith configuration. The sum of weights may be 1. $T_i$ may be the temperature of the ith configuration.

In an embodiment, the processor 320 may identify the temperature of the electronic device 301 with reference to Equation 2 below.

$$\text{Temperature} = \alpha_l \times T_l + \sum_{i=1}^{N} \alpha_i \times T_i \quad \text{[Equation 2]}$$

In Equation 2, $T_l$ may be the temperature of the area where the electronic device 301 is located. $\alpha_l$ may be the weight applied to the temperature of the area. The sum of weights may be 1.

In an embodiment, when it is discriminated that the first input is the specified input, the processor 320 may identify a temperature. In an embodiment, the processor 320 may continue identifying a temperature, regardless of the first input.

According an embodiment, the processor 320 may identify a state change condition of the display 360. In an embodiment, the state change condition may be a condition for triggering a state change of the display 360. In an embodiment, the state change condition may include a length of the trigger input, an input time of the trigger input, a gesture type of the trigger input, or a combination thereof. For example, when the trigger input is a drag input, the state change condition may be that the trigger input is dragged by a specified length. In an embodiment, the state change condition may be referred to as a size change condition of the display 360.

In an embodiment, the processor 320 may identify a state change condition based on the temperature. For example, the more the temperature increases, the more the length of the trigger input may increase. For another example, the more the temperature increases, the more the input time of the trigger input may increase. For another example, as the temperature increases, the gesture of the trigger input may change to a gesture which requests more operations.

In an embodiment, the processor 320 may identify latency based on the temperature and may identify a state change condition based on the latency. In an embodiment, the latency may be a time set to prevent/inhibit the electronic device 301 from changing a state at a relatively high temperature. In an embodiment, the latency may be a time required between the start of the trigger input and the end of the trigger input. In an embodiment, the more the temperature increases, the longer the latency may be. The latency will be described in greater detail below with reference to FIGS. 5, 6, and 7.

In an embodiment, the processor 320 may output a user interface (UI) guiding a state change condition. In an embodiment, the processor 320 may output a user interface guiding a condition for triggering a state change. In an embodiment, the user interface may include a graphic UI (GUI), an auditory UI (AUI), a tangible UI (TUI), or a combination thereof.

In an embodiment, the processor 320 may change a shape of the user interface. In an embodiment, the processor 320 may adjust the shape of the user interface, depending on the state change condition. In an embodiment, the processor 320 may adjust the shape of the user interface, depending on the temperature.

In an embodiment, as the temperature increases, the processor 320 may change a color of the graphic user interface output on the display 360. For example, the more the temperature increases, the higher the saturation of the user interface may be. For another example, the more the temperature increases, the lower the brightness of the user interface may be.

In an embodiment, as the latency increases, the processor 320 may change a color of the graphic user interface output on the display 360. For example, the more the latency increases, the higher the saturation of the user interface may be. For another example, the more the latency increases, the lower the brightness of the user interface may be.

In an embodiment, as the temperature increases, the processor 320 may change intensity, a frequency, and/or a sound source of the auditory user interface output through a sound output module (e.g., a sound output module 155 of FIG. 1).

In an embodiment, as the latency increases, the processor 320 may change intensity, a frequency, and/or a sound source of the auditory user interface output through the sound output module (e.g., the sound output module 155 of FIG. 1).

In an embodiment, as the temperature increases, the processor 320 may change an amplitude and/or a frequency of the tangible user interface output through a haptic module (e.g., a haptic module 179 of FIG. 1).

In an embodiment, as the latency increases, the processor 320 may change an amplitude and/or a frequency of the tangible user interface output through the haptic module (e.g., the haptic module 179 of FIG. 1).

In an embodiment, the processor 320 may identify a second input. In an embodiment, the second input may be an input subsequent to the first input. In an embodiment, the second input may be an input consecutive from the first input. In an embodiment, the second input may configure a trigger input together with the first input. For example, the second input may be a drag input extending from a position at which the first input is input.

In an embodiment, the second input may be an input identified by means of the display 360. In an embodiment, the second input may be an input identified by means of the input module 350.

In an embodiment, the processor 320 may output a user interface based on the second input. In an embodiment, the processor 320 may adjust a shape of the user interface, depending on the second input. In an embodiment, the processor 320 may output a user interface indicating a degree to which the state change condition is satisfied depending on the second input.

According an embodiment, the processor 320 may identify whether the second input satisfies the state change condition. According an embodiment, the processor 320 may identify whether the first input and the second input satisfy the state change condition.

For example, the processor 320 may discriminate whether the second input is input by an input length required according to the state change condition. For another example, the processor 320 may discriminate whether the second input is input by an input time required according to the state change condition.

In an embodiment, the processor 320 may adjust an area of the display 360. In an embodiment, when the state change condition is satisfied, the processor 320 may adjust the area of the display 360. In an embodiment, when the state change condition is satisfied, the processor 320 may control the driving unit 340 to adjust the area of the display 360. In an embodiment, when the state change condition is satisfied, the processor 320 may control the driving unit 340 to expand and/or collapse the display 360.

Figure 4A:
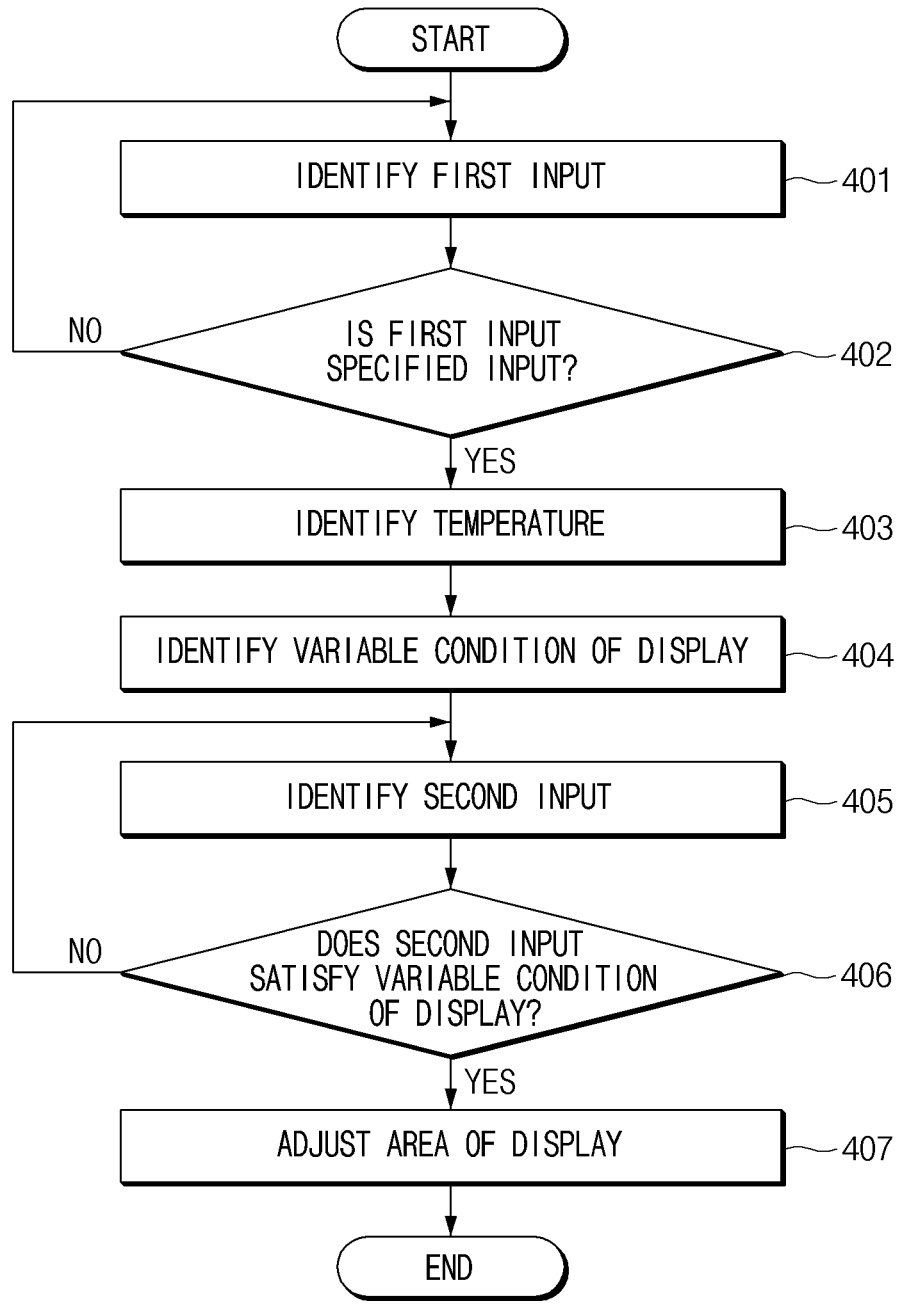
FIG. 4A is a flowchart illustrating an example operation of an electronic device according to various embodiments.
Figure 4B:
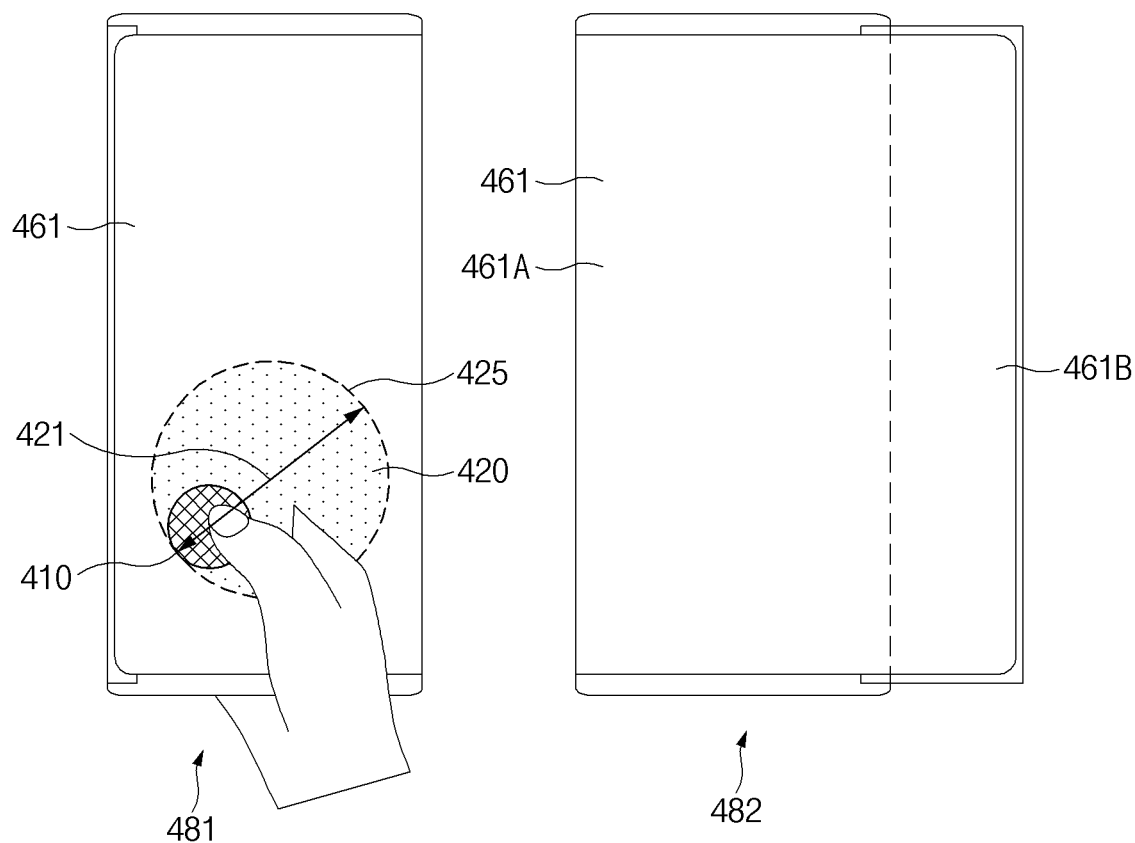
FIG. 4B is a diagram illustrating user interfaces of an electronic device according to various embodiments.

FIG. 4A is a flowchart illustrating an example operation of an electronic device 301 according to various embodiments. FIG. 4B is a diagram illustrating example user interfaces 410 and 420 of an electronic device 301 according to various embodiments.

Operations of FIG. 4A may be performed by an electronic device 301 of FIG. 3. The operations of FIG. 4A may be performed by an electronic device 101 of FIG. 1, 2A, 2B, 2C, 2D, or 2E.

Referring to FIG. 4A, in operation 401, the electronic device 301 may identify a first input. In an embodiment, the first input may be an input identified by means of a display 360. In an embodiment, the first input may be an input identified by means of an input module 350.

In operation 402, the electronic device 301 may discriminate (e.g., determine) whether the first input is a specified input. In an embodiment, the specified input may be a portion of an input for triggering a state change of the electronic device 301. In an embodiment, the input for triggering the state change may be input for expanding or collapsing a visible area of the display 360. In an embodiment, the input for triggering the state change may be referred to as a trigger input.

Referring to FIG. 4B, while the electronic device 301 is in a collapsed state 481, it may identify the first input. In an embodiment, the electronic device 301 may identify the first input by means of the display 360. In an embodiment, the first input may be a portion (e.g., touch) of a drag input for triggering a state change.

In an embodiment, the electronic device 301 may output a user interface 410 indicating a position of the first input.

In operation 403, the electronic device 301 may identify a temperature. In an embodiment, the electronic device 301 may identify a temperature of the electronic device 301 by means of a sensor 376. In an embodiment, the electronic device 301 may identify temperatures of components (e.g., the display 360 and a driving unit 340) of the electronic device 301 by means of the sensor 376.

In operation 404, the electronic device 301 may identify a state change (e.g., variable) condition of the display 360. In an embodiment, the electronic device 301 may identify the state change condition based on the temperature. In an embodiment, the state change condition may include a length of the trigger input, an input time of the trigger input, a gesture type of the trigger input, or a combination thereof.

Referring to FIG. 4B, the electronic device 301 may output a user interface 420 guiding the state change condition. In an embodiment, the user interface 420 may have an area 425 according to a length 421 of the trigger input required according to the state change condition. The user interface 420 is illustrated, for example, as a circle in FIG. 4B, but this is only an example. In an embodiment, the user interface 420 may be output in various forms capable of indicating a condition for releasing the trigger input. For example, the user interface 420 may be output as an oval, a polygon, and/or a straight shape. In an embodiment, the condition for releasing the trigger input may be a position of a release point of a touch and/or a drag length, when the trigger input is drag.

In operation 405, the electronic device 301 may identify a second input. In an embodiment, the second input may be an input subsequent to the first input. In an embodiment, the second input may be an input consecutive from the first input. In an embodiment, the second input may configure a trigger input together with the first input. In an embodiment, the second input may be an input identified by means of the display 360. In an embodiment, the second input may be an input identified by means of the input module 350.

In operation 406, the electronic device 301 may discriminate (e.g., determine) whether the second input satisfies the state change condition. In an embodiment, the electronic device 301 may discriminate whether the first input and the second input satisfy the state change condition.

In operation 407, the electronic device 301 may adjust an area of the display 360. In an embodiment, the electronic device 301 may control the driving unit 340 to adjust the area of the display 360. In an embodiment, the electronic device 301 may control the driving unit 340 to expand and/or collapse the display 360.

Referring to FIG. 4B, the electronic device 301 may change from a collapsed state 481 to an expanded state 482. In an embodiment, the electronic device 301 may change from the collapsed state 481 to the expanded state 482, such that a second display area 461B is visible together with a first display area 461A in the display 461.

It is illustrated, for example in FIG. 4B that the electronic device 301 changes from the collapsed state 481 to the expanded state 482 based on the first input and the second input, but this is only example. In an embodiment, the electronic device 301 may change from the expanded state 482 to the collapsed state 481 based on the first input and the second input. In an embodiment, the electronic device 301 may change among the collapsed state 481, the expanded state 482, or an intermediate state thereof (e.g., an intermediate state of the collapsed state 481 and the expanded state 482) based on the first input and the second input.

Figure 5:
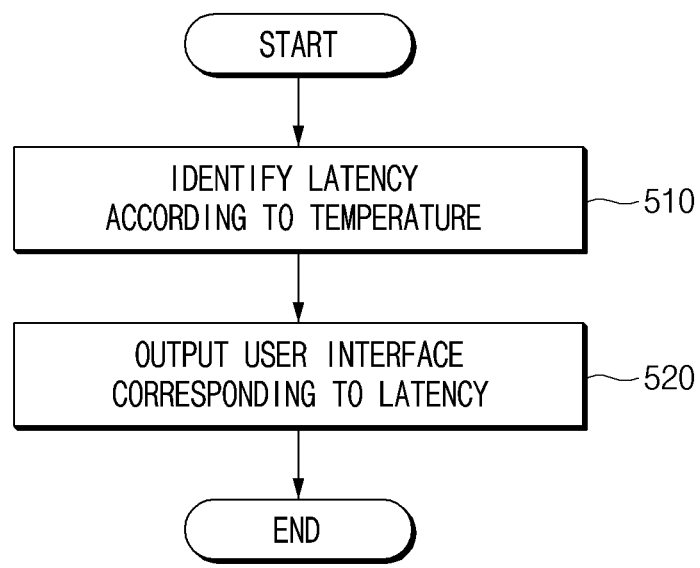
FIG. 5 is a flowchart illustrating an example operation of outputting a user interface in an electronic device according to various embodiments.

FIG. 5 is a flowchart illustrating an example operation of outputting a user interface in an electronic device 301 according to various embodiments.

Operations of FIG. 5 may be performed by an electronic device 301 of FIG. 3. The operations of FIG. 5 may be performed by an electronic device 101 of FIG. 1, 2A, 2B, 2C, 2D, or 2E.

In an embodiment, the operations of FIG. 5 may be performed after operation 404 of FIG. 4A. In an embodiment, the operations of FIG. 5 may be performed in parallel with operation 404 of FIG. 4A. In an embodiment, the operations of FIG. 5 may be performed in parallel with operation 405 or 406 of FIG. 4A.

Referring to FIG. 5, in operation 510, the electronic device 301 may identify latency according to a temperature. In an embodiment, the latency may be a time set to prevent/inhibit the electronic device 301 from changing a state at a relatively high temperature. In an embodiment, the latency may be a time required between the start of the trigger input and the end of the trigger input.

In operation 520, the electronic device 301 may output a user interface corresponding to the latency.

In an embodiment, the electronic device 301 may identify a state change condition corresponding to the latency (e.g., a length of the trigger input, an input time of the trigger input, a gesture type of the trigger input, or a combination thereof). In an embodiment, the electronic device 301 may output a user interface guiding the state change condition.

Figure 6:
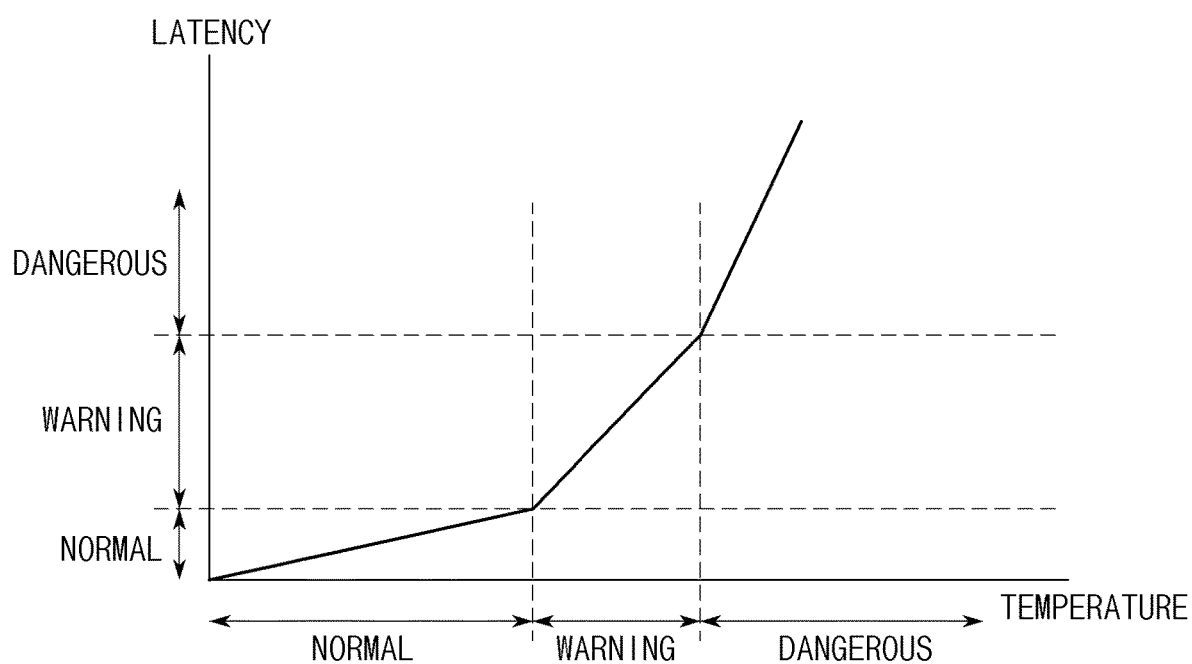
FIG. 6 is a graph illustrating a relationship between a temperature and latency according to various embodiments.

FIG. 6 is a graph illustrating a relationship between a temperature and latency. FIG. 6 will be described with reference to the electronic device 301 of FIG. 3.

In an embodiment, the electronic device 301 may classify a temperature of the electronic device 301 as a different temperature range. In an embodiment, the different temperature range may be classified as a normal temperature range, a warning temperature range, or a dangerous temperature range.

Referring to FIG. 6, the electronic device 301 may set latency corresponding to the different temperature range. In an embodiment, the latency may be set according to the normal temperature range, the warning temperature range, or the dangerous temperature range.

In an embodiment, an increase in latency according to an increase in temperature may adaptively increase depending on a temperature. In an embodiment, the increase in latency according to the increase in temperature may adaptively increase depending on a temperature range. For example, an increase in latency in the warning temperature range may be greater than an increase in latency in the normal temperature range.

In an embodiment, as the temperature increases, the latency may gradually increase. In an embodiment, although the temperature increases, there may be a temperature range in which latency does not increase. For example, the latency may be set to upper latency at a specified temperature or more. In an embodiment, the specific temperature may be present in at least one of the normal temperature range, the warning temperature range, or the dangerous temperature range.

In an embodiment, as the temperature decreases, the latency may gradually decrease. In an embodiment, although the temperature decreases, there may be a temperature range in which latency does not decrease. For example, the latency may be set to lower latency at the specified temperature or less. In an embodiment, the specific temperature may be present in at least one of the normal temperature range, the warning temperature range, or the dangerous temperature range.

In an embodiment, the electronic device 301 may output a user interface guiding a state change condition based on the latency identified according to the temperature of the electronic device 301.

Figure 7:
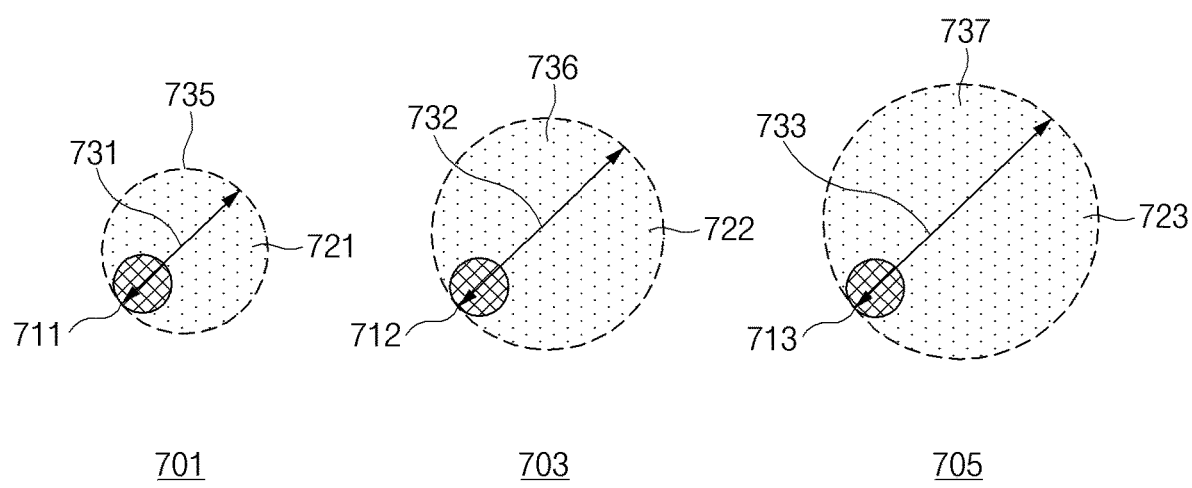
FIG. 7 is a diagram illustrating an example user interface output according to latency by an electronic device according to various embodiments.

FIG. 7 is a diagram illustrating an example user interface output according to latency by an electronic device 301 according to various embodiments. FIG. 7 will be described with reference to the electronic device 301 of FIG. 3.

Reference numeral 701 indicates an example of outputting a user interface 711 indicating a position of a user input and a user interface 721 guiding a state change condition, depending on the user input which is input when the electronic device 301 is in a normal temperature range. In an embodiment, the user interface 721 may have an area 735 according to a length 731 of a trigger input required according to the state change condition.

Reference numeral 703 indicates an example of outputting a user interface 712 indicating a position of a user input and a user interface 722 guiding a state change condition, depending on the user input which is input when the electronic device 301 is in a warning temperature range. In an embodiment, the user interface 722 may have an area 736 according to a length 732 of a trigger input required according to the state change condition.

Reference numeral 705 indicates an example of outputting a user interface 713 indicating a position of a user input and a user interface 723 guiding a state change condition, depending on the user input which is input when the electronic device 301 is in a dangerous temperature range. In an embodiment, the user interface 723 may have an area 737 according to a length 733 of a trigger input required according to the state change condition.

Referring to reference numerals 701, 703, and 705, lengths 731, 732, and 733 of a second input required to trigger a state change may become long as it goes from the normal temperature range to the dangerous temperature range.

Referring to reference numerals 701, 703, and 705, areas 735, 736, and 737 of circles for guiding the second input required to trigger the state change may increase as they go from the normal temperature range to the dangerous temperature range.

In an embodiment, colors of the user interfaces 721, 722, and 723 guiding the state change condition may change as they go from the normal temperature range to the dangerous temperature range. In an embodiment, saturation of the user interfaces 721, 722, and 723 may increase as it goes from the normal temperature range to the dangerous temperature range. In an embodiment, brightness of the user interfaces 721, 722, and 723 may decrease as it goes from the normal temperature range to the dangerous temperature range.

In an embodiment, colors of the user interfaces 711, 712, and 713 indicating positions of user inputs may change as they go from the normal temperature range to the dangerous temperature range. In an embodiment, saturation of the user interfaces 711, 712, and 713 may increase as it goes from the normal temperature range to the dangerous temperature range. In an embodiment, brightness of the user interfaces 711, 712, and 713 may decrease as it goes from the normal temperature range to the dangerous temperature range.

Figure 8:
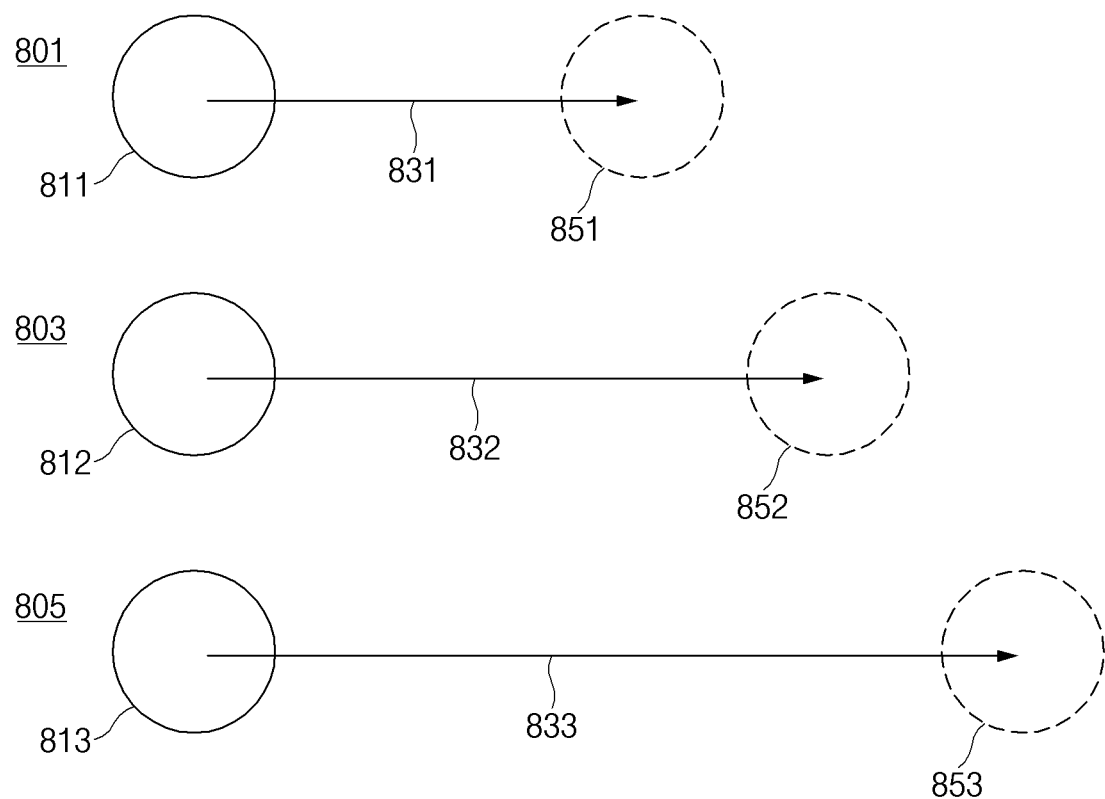
FIG. 8 is a diagram illustrating an example user interface guiding an end point of a trigger input according to various embodiments.

FIG. 8 is a diagram illustrating an example user interface guiding an end point of a trigger input according to various embodiments. FIG. 8 will be described with reference to the electronic device 301 of FIG. 3.

Reference numeral 801 indicates an example of outputting a user interface 811 indicating a position of a user input and a user interface 851 guiding an end point of a trigger input, depending on the user input which is input when the electronic device 301 is in a normal temperature range. In an embodiment, the user interface 851 may be displayed spaced apart from the user interface 811 at a length 831 of a trigger input required according to a state change condition.

Reference numeral 803 indicates an example of outputting a user interface 812 indicating a position of a user input and a user interface 852 guiding an end point of a trigger input, depending on the user input which is input when the electronic device 301 is in a warning temperature range. In an embodiment, the user interface 852 may be displayed spaced apart from the user interface 812 at a length 832 of the trigger input required according to the state change condition.

Reference numeral 805 indicates an example of outputting a user interface 813 indicating a position of a user input and a user interface 853 guiding an end point of a trigger input, depending on the user input which is input when the electronic device 301 is in a dangerous temperature range. In an embodiment, the user interface 853 may be displayed spaced apart from the user interface 813 at a length 833 of the trigger input required according to the state change condition.

Figure 9:
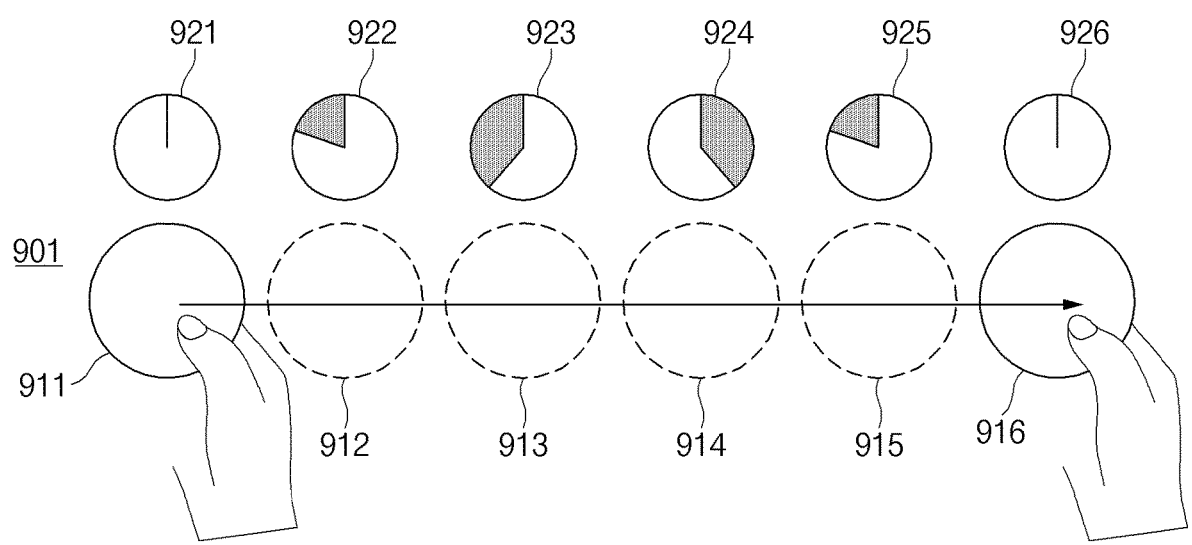
FIG. 9 is a diagram illustrating an example user interface indicating a degree to which a state change condition is satisfied according to various embodiments.

FIG. 9 is a diagram illustrating an example user interface 901 indicating a degree to which a state change condition is satisfied according to various embodiments. FIG. 9 will be described with reference to the electronic device 301 of FIG. 3.

Referring to FIG. 9, the electronic device 301 may display user interfaces 921, 922, 923, 924, 925, and 926 which are adjacent to user interfaces 911, 912, 913, 914, 915, and 916 indicating positions of user inputs and indicate degrees to which a state change condition is satisfied.

In an embodiment, when the position of the user interface 911 corresponds to a starting point of a trigger input and when the position of the user interface 916 corresponds to an end point of the trigger input, the user interfaces 921, 922, 923, 924, 925, and 926 may increase in area (e.g., shadow area) indicating the degree to which the state change condition is satisfied as the user input goes from the starting point to the end point.

It is illustrated in FIG. 9 that the positions of the user interfaces 921, 922, 923, 924, 925, and 926 are adjacent to the user interfaces 911, 912, 913, 914, 915, and 916, but this is only an example. In an embodiment, the positions of the user interfaces 921, 922, 923, 924, 925, and 926 may be located around user interfaces (e.g., user interfaces 721, 722, and 723) guiding the state change condition.

Figure 10:
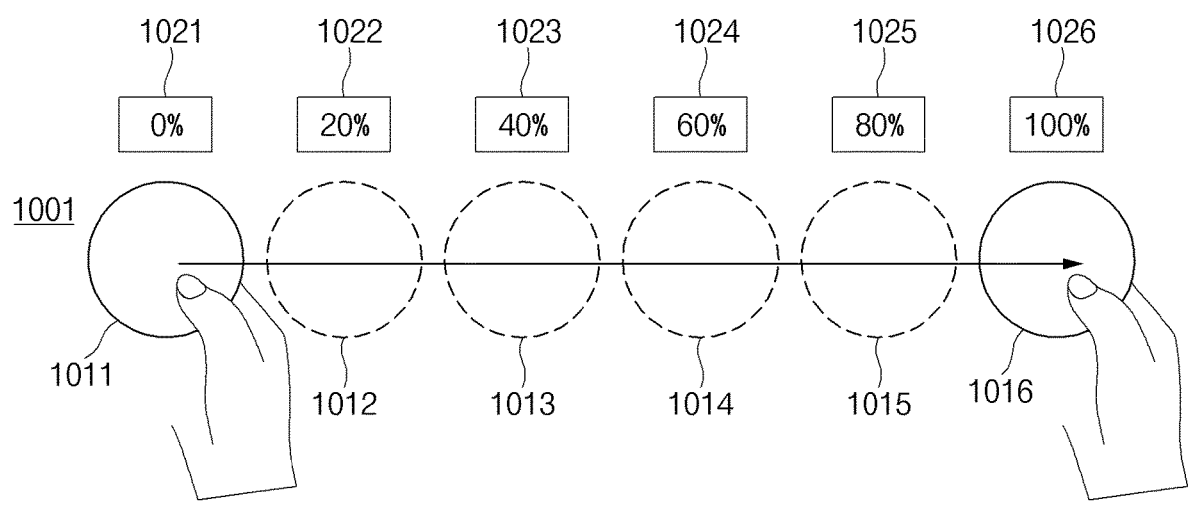
FIG. 10 is a diagram illustrating an example user interface indicating a degree to which a state change condition is satisfied according to various embodiments.

FIG. 10 is a diagram illustrating an example user interface 1001 indicating a degree to which a state change condition is satisfied. FIG. 10 will be described with reference to the electronic device 301 of FIG. 3.

Referring to FIG. 10, the electronic device 301 may display user interfaces 1021, 1022, 1023, 1024, 1025, and 1026 which are adjacent to user interfaces 1011, 1012, 1013, 1014, 1015, and 1016 indicating positions of user inputs and indicate degrees to which a state change condition is satisfied.

In an embodiment, when the position of the user interface 1011 corresponds to a starting point of a trigger input and when the position of the user interface 1016 corresponds to an end point of the trigger input, the user interfaces 1021, 1022, 1023, 1024, 1025, and 1026 may increase in value indicating the degree to which the state change condition is satisfied as the user input goes from the starting point to the end point.

It is illustrated in FIG. 10 that the positions of the user interfaces 1021, 1022, 1023, 1024, 1025, and 1026 are adjacent to the user interfaces 1011, 1012, 1013, 1014, 1015, and 1016, but this is only an example. In an embodiment, the positions of the user interfaces 1021, 1022, 1023, 1024, 1025, and 1026 may be located around user interfaces (e.g., user interfaces 721, 722, and 723) guiding the state change condition.

Figure 11A:
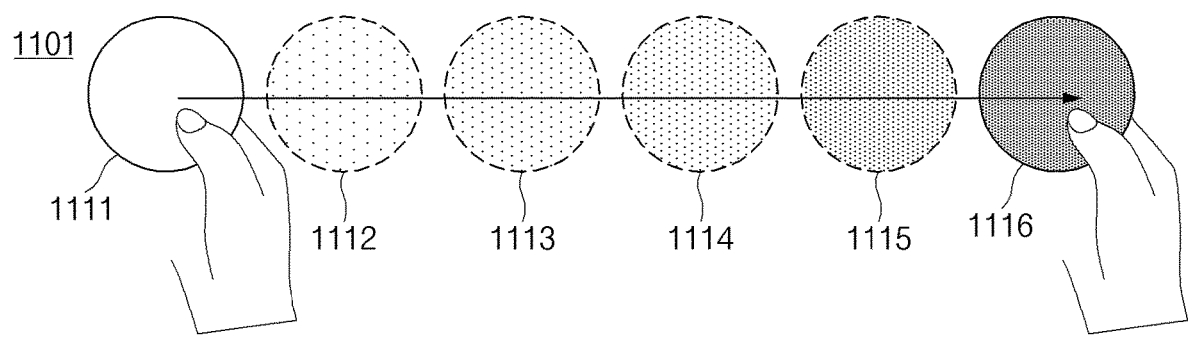
FIG. 11A is a diagram illustrating an example user interface indicating a degree to which a state change condition is satisfied according to various embodiments.
Figure 11B:
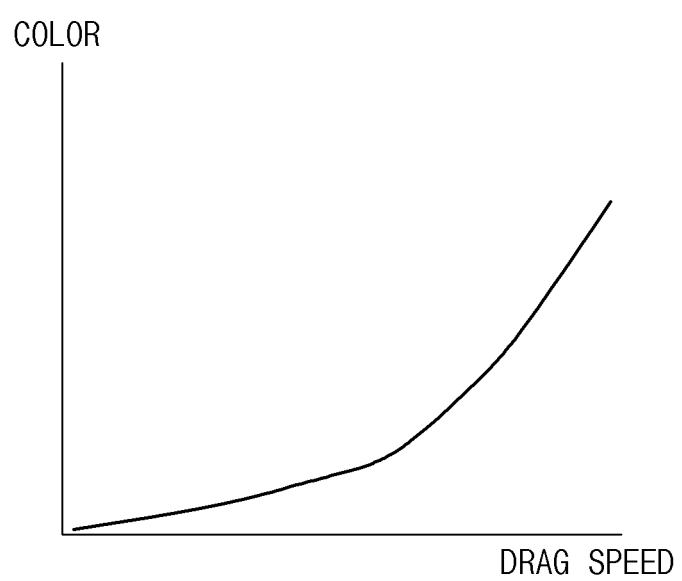
FIG. 11B is a graph illustrating a relationship between changes in drag speed and color according to various embodiments.

FIG. 11A is a diagram illustrating an example user interface 1101 according to a state of a trigger input according to various embodiments. FIG. 11B is a graph illustrating a relationship between changes in drag speed and color according to various embodiments. FIGS. 11A and 11B will be described with reference to the electronic device 301 of FIG. 3.

In an embodiment, the electronic device 301 may change an output of a user interface depending on a state of a trigger input to notify a user of the state of the trigger input. In an embodiment, the state of the trigger input may include a speed of the trigger input.

Referring to FIG. 11A, the electronic device 301 may display user interfaces 1111, 1112, 1113, 1114, 1115, and 1116 according to the state of the trigger input. In an embodiment, the more the speed of the trigger input increases, the more the electronic device 301 may increase saturation of the user interfaces 1111, 1112, 1113, 1114, 1115, and 1116. In an embodiment, the more the speed of the trigger input increases, the more the electronic device 301 may decrease brightness of the user interfaces 1111, 1112, 1113, 1114, 1115, and 1116.

Referring to FIG. 11B, the more the speed of a trigger input (e.g., drag) increases, the larger the electronic device 301 may set an amount of change in color (e.g., saturation and/or brightness) to be.

Figure 12:
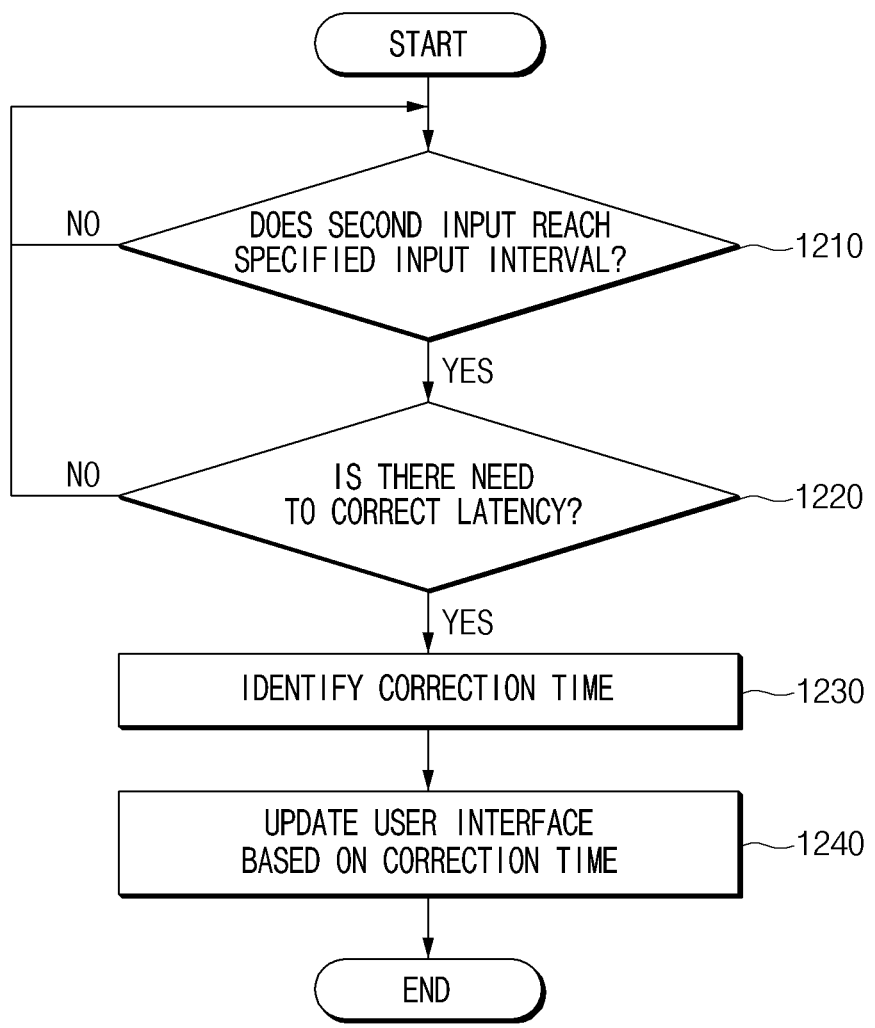
FIG. 12 is a flowchart illustrating an example operation of adaptively correcting latency in an electronic device according to various embodiments.
Figure 13A:
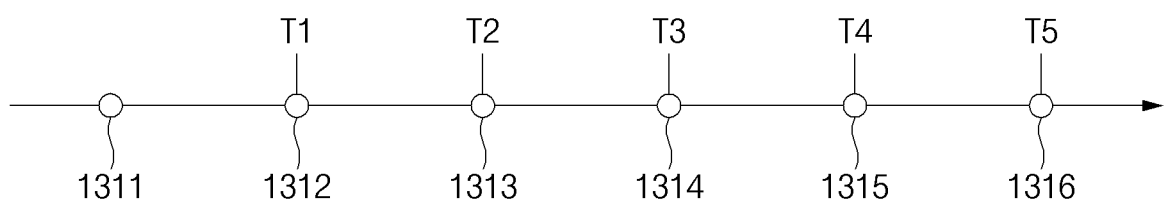
FIG. 13A is a diagram illustrating a relationship between a position of a second input and latency according to various embodiments.
Figure 13B:
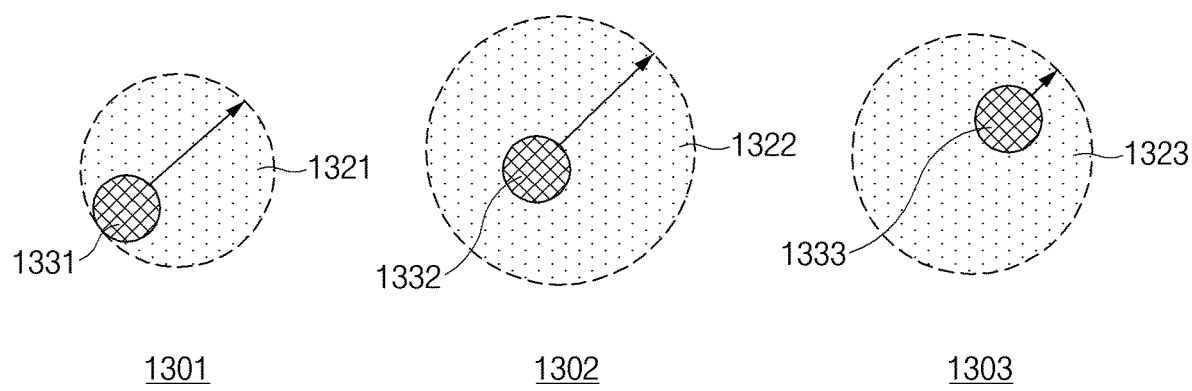
FIG. 13B is a diagram illustrating an example user interface which changes depending on a second input and latency according to various embodiments.

FIG. 12 is a flowchart illustrating an example operation of adaptively correcting latency in an electronic device 301 according to various embodiments. FIG. 13A is a diagram illustrating a relationship between a position of a second input and latency according to various embodiments. FIG. 13B is a diagram illustrating an example user interface which changes depending on a second input and latency according to various embodiments.

Operations of FIG. 12 may be performed by the electronic device 301 of FIG. 3. The operations of FIG. 12 may be performed by electronic device 101 of FIG. 1, 2A, 2B, 2C, 2D, or 2E.

In an embodiment, the operations of FIG. 12 may be performed after operation 404 of FIG. 4A. In an embodiment, the operations of FIG. 12 may be performed in parallel with operation 404 of FIG. 4A. In an embodiment, the operations of FIG. 12 may be performed in parallel with operation 405 or 406 of FIG. 4A.

Referring to FIG. 4A, in operation 1210, the electronic device 301 may discriminate (e.g., determine) whether a second input reaches a specified input interval. In an embodiment, the electronic device 301 may discriminate whether the second input reaches a last position of the specified input interval. In an embodiment, the specified input interval may be an input interval subsequent to an input interval where the second is located.

Referring to FIG. 13A, a starting point 1311 and an end point 1316 of a trigger input may be divided into a plurality of intervals by a plurality of midpoints 1312, 1313, 1314, and 1315. In an embodiment, the electronic device 301 may distribute latency to a plurality of intervals. In an embodiment, when the trigger input starts, target times T1, T2, T3, T4, and T5 respectively distributed to the plurality of intervals may be identical to each other. In an embodiment, the sum of the target times may correspond to latency set when the trigger input starts. For example, when the latency set when the trigger input starts is 3 seconds, the target times may be 600 milliseconds.

Referring to FIG. 13B, reference numeral 1301 may indicate a user interface 1331 indicating an input position when a user initiates a trigger input and a user interface 1321 guiding a state change condition. In an embodiment, the user interface 1331 may indicate that the trigger input is located at the starting point 1311. In an embodiment, the user interface 1321 may have an area according to a length of the trigger input corresponding to the set latency.

For example, when the second input is located at the starting point 1311, the electronic device 301 may discriminate whether the second input reaches a last position (e.g., the first midpoint 1312) of a first interval divided by the starting point 1311 and the first midpoint 1312. For another example, when the second input is located at the first midpoint 1312, the electronic device 301 may discriminate whether the second input reaches a last position (e.g., the second midpoint 1313) of a second interval divided by the first midpoint 1312 and the second midpoint 1313.

When it is discriminated (e.g., determined) that the second input reaches the specified input interval in operation 1210, the electronic device 301 may perform operation 1220. When it is discriminated (e.g., determined) that the second input does not reach the specified input interval in operation 1210, the electronic device 301 may perform operation 1210 again.

In operation 1220, the electronic device 301 may identify whether there is a need to correct the latency.

In an embodiment, the electronic device 301 may identify whether there is a need to correct the latency based on a time when the second input is located at the first midpoint 1312.

In an embodiment, when the time when the second input is located at the first midpoint 1312 is shorter than a target time, the electronic device 301 may identify that there is the need to correct the latency.

For example, when the first target time T1 is 600 milliseconds and when the time when the second input is located at the first midpoint 1312 is 500 milliseconds, the electronic device 301 may identify that there is the need to correct the latency. For another example, when the first target time T1 is 600 milliseconds and when the time when the second input is located at the first midpoint 1312 is 700 milliseconds, the electronic device 301 may identify that there is no need to correct the latency.

When it is discriminated (e.g., determined) that there is the need to correct the latency in operation 1220, the electronic device 301 may perform operation 1230. When it is discriminated (e.g., determined) that there is no need to correct the latency in operation 1220, the electronic device 301 may perform operation 1210 again.

In operation 1230, the electronic device 301 may identify a correction time.

In an embodiment, the electronic device 301 may identify a difference value of a time when it reaches the specified input interval at the target time as the correction time. In an embodiment, the electronic device 301 may equally distribute the correction time to the remaining intervals, thus adjusting target times of the remaining intervals.

For example, when the first target time T1 is 600 milliseconds and when the time when the second input is located at the first midpoint 1312 is 400 milliseconds, the electronic device 301 may identify the correction time as 200 milliseconds. In this case, the electronic device 301 may increase the target times of the remaining intervals by 50 milliseconds. Thus, the target time T2 of the second interval divided by the first midpoint 1312 and the second midpoint 1313 may increase from 600 milliseconds to 650 milliseconds. Likewise, the target time T3 of the third interval divided by the second midpoint 1313 and the third midpoint 1314, the target time T4 of the fourth interval divided by the third midpoint 1314 and the fourth midpoint 1315, and the target time T5 of the fifth interval divided by the fourth midpoint 1315 and the end point 1316 may also increase to 650 milliseconds.

In operation 1240, the electronic device 301 may update a user interface based on the correction time.

Referring to FIG. 13B, reference numeral 1302 may indicate a user interface 1332 indicating an input position when a user allows a trigger input to reach a specified position and a user interface 1322 guiding a state change condition. In an embodiment, the user interface 1322 may have an area which is wider than the user interface 1321 as the target times of the remaining intervals increase.

In an embodiment, a time spent when the user allows the trigger input to reach a next specified position is greater than the target time, the user interface guiding the state change condition may become narrow in area. Referring to FIG. 13B, reference numeral 1303 may indicate a user interface 1333 indicating an input position when the user allows a trigger input to reach a next specified position and a user interface 1323 guiding a state change condition. In an embodiment, the user interface 1323 may have an area which is narrower than the user interface 1322 as the target times of the remaining intervals decrease.

An electronic device according to an example embodiment of the disclosure may include: a sensor configured to measure a temperature of the electronic device, a flexible display, a size of a visible area of which is changeable, at least one processor, comprising processing circuitry, and a memory storing instructions. at least one processor, individually and or collectively, may be configured to: cause the electronic device to identify a first input, identify the temperature of the electronic device via the sensor based on identifying the first input, identify a size change condition of the flexible display based on the identified temperature, identify a second input, and change the size of the visible area, based on the second input satisfying the size change condition.

In an example embodiment, at least one processor, individually and/or collectively, may be configured to cause the electronic device to output a user interface for indicating the size change condition.

In an example embodiment, the user interface may include a graphic user interface output on the flexible display.

In an example embodiment, the graphic user interface may be configured to change in color and/or size based on the identified temperature.

In an example embodiment, the graphic user interface may change in color and/or size based on a movement speed of the second input.

In an example embodiment, the first input and the second input may include inputs applied to the flexible display.

In an example embodiment, the second input may include a drag input extending from a position at which the first input is input, a size change condition may include the second input being dragged by a specified length, wherein the specified length may vary based on the identified temperature.

In an example embodiment, the electronic device may further include a speaker (e.g., a sound output module 155 of FIG. 1). The user interface may include an auditory user interface configured to be output through the speaker.

In an example embodiment, an input module comprising input circuitry may be included. The At least one processor, individually and/or collectively, may be configured to cause the electronic device to identify the first input and the second input via the input module. The input module may include at least one of a physical button, a dial, a toggle, a digital pen (e.g., a stylus pen), and/or a wheel.

In an example embodiment, a haptic module (e.g., a haptic module 179 of FIG. 1) including haptic circuitry may be included. The user interface may be a tangible user interface output through the haptic module.

A method of operating an electronic device according to an example embodiment of the disclosure may include: identifying a first input, identifying a temperature of the electronic device using a sensor of the electronic device based on identifying the first input, identifying a size change condition of a flexible display of the electronic device based on the identified temperature, identifying a second input, and changing a size of a visible area of the flexible display, based on that the second input satisfying the size change condition.

The method of the electronic device according to an example embodiment of the disclosure may further include outputting a user interface indicating the size change condition.

In an example embodiment, the user interface may include a graphic user interface output on the flexible display.

In an example embodiment, the graphic user interface may change in color and/or size depending on the identified temperature.

In an based embodiment, the graphic user interface may change in color and/or size based on a movement speed of the second input.

In an example embodiment, the first input and the second input may include inputs applied to the flexible display.

In an example embodiment, the second input may include a drag input extending from a position at which the first input is input, the size change condition may include the second input being dragged by a specified length, wherein the specified length may vary with the identified temperature.

In an example embodiment, a speaker (e.g., a sound output module 155 of FIG. 1) may be included. The user interface may include an auditory user interface output through the speaker.

In an example embodiment, it may be configured to identify the first input and the second input using an input module of the electronic device. The input module may include at least one of a physical button, a dial, or a wheel.

In an example embodiment, the user interface may include a tangible user interface output through a haptic module (e.g., a haptic module 179 of FIG. 1) of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a sensor configured to measure a temperature of the electronic device;
a flexible display, a size of visible area of which is changeable;
memory storing executable instructions; and
at least one processor, comprising processing circuitry, configured to access the memory and execute the instructions,
wherein at least one processor, individually and/or collectively, is configured to:
identify an input for changing a size of the visible area of the flexible display;
identify a temperature of the electronic device using the sensor based on identifying the input;
based on the identified temperature being included in a first temperature range, change the size of the visible area of the flexible display according to a first specified condition; and
based on the identified temperature being included in a second temperature range different from the first temperature range, change the size of the visible area of the flexible display according to a second specified condition,
wherein the first specified condition includes a first delay time and the second specified condition includes a second delay time.

2. The electronic device of claim 1, wherein the second delay time is longer than the first delay time.

3. The electronic device of claim 1, wherein at least one processor, individually and/or collectively, is configured to:
output a user interface indicating the first specified condition or the second specified condition.

4. The electronic device of claim 3, wherein the user interface includes a graphic user interface output on the flexible display, and
wherein the graphic user interface is configured to change color and/or size based on the identified temperature.

5. The electronic device of claim 3, further comprising:
a speaker,
wherein the user interface includes an auditory user interface configured to be output through the speaker.

6. The electronic device of claim 3, further comprising:
a haptic module comprising haptic circuitry,
wherein the user interface includes a haptic user interface configured to be output through the haptic module.

7. The electronic device of claim 1, wherein the input for changing the size of the visible area of the flexible display includes a first input and a second input subsequent to the first input,
wherein at least one processor, individually and/or collectively, is configured to:
identify the temperature of the electronic device using the sensor based on identifying the first input; and
change the size of the visible area of the flexible display based on the second input.

8. The electronic device of claim 7, wherein flexible display is configured to receive the first input and the second input.

9. The electronic device of claim 8, wherein the second input includes a drag input extending from a position at which the first input is input,
wherein drag input is identified as an input for changing the size of the visible area of the flexible display based on the drag input being a specified length, and
wherein the specified length corresponds to the identified temperature.

10. The electronic device of claim 7, wherein at least one processor, individually and/or collectively, is configured to output a graphic user interface indicating the first specified condition and the second specified condition,
wherein the graphic user interface is configured to change color and/or size based on a movement speed of the second input.

11. The electronic device of claim 1, further comprising:
an input module comprising input circuitry,
wherein at least one processor, individually and/or collectively, is configured to:
identify the input via the input module, and wherein the input module includes at least one of a physical button, a dial, a toggle, a stylus pen, or a wheel.

12. The electronic device of claim 1, wherein the size of the visible area of the flexible display is changed after the first delay time or the second delay time.

13. A method of operating an electronic device, comprising:
   identifying an input for changing a size of a visible area of a flexible display of the electronic device;
   identifying a temperature of the electronic device using a sensor of the electronic device based on identifying first input;
   based on the identified temperature being included in a first temperature range, changing the size of the visible area of the flexible display according to a first specified condition; and
   based on the identified temperature being included in a second temperature range different from the first temperature range, changing the size of the visible area of the flexible display according to a second specified condition,
   wherein the first specified condition includes a first delay time and the second specified condition includes a second delay time.

14. The method of claim 13, wherein the second delay time is longer than the first delay time.

15. The method of claim 13, further comprising:
   outputting a user interface indicating the first specified condition or the second specified condition,
   wherein the user interface includes a graphic user interface output on the flexible display.

16. The method of claim 15, wherein the graphic user interface is configured to change in color and/or size based on the identified temperature.

17. The method of claim 13, wherein the input for changing the size of the visible area of the flexible display includes a first input and a second input subsequent to the first input,
   wherein the temperature is identified based on identifying the first input, and
   wherein the size of the visible area of the flexible display is changed based on the second input.

18. The method of claim 13, wherein the size of the visible area of the flexible display is changed after the first delay time or the second delay time.

19. A computer program product stored on a non-transitory machine-readable storage medium comprising instructions which, when executed by an electronic device, cause the electronic device to perform operations comprising:
   identifying an input for changing a size of a visible area of a flexible display of the electronic device;
   identifying a temperature of the electronic device using a sensor of the electronic device based on identifying first input;
   based on the identified temperature being included in a first temperature range, changing the size of the visible area of the flexible display according to a first specified condition; and
   based on the identified temperature being included in a second temperature range different from the first temperature range, changing the size of the visible area of the flexible display according to a second specified condition,
   wherein the first specified condition includes a first delay time and the second specified condition includes a second delay time.

* * * * *